INVENTOR
Rene' A. Baudry.
BY 7. P. Lyle
ATTORNEY

Nov. 12, 1963 R. A. BAUDRY 3,110,827
DYNAMOELECTRIC MACHINE
Filed Aug. 12, 1960 3 Sheets-Sheet 2

United States Patent Office 3,110,827
Patented Nov. 12, 1963

3,110,827
DYNAMOELECTRIC MACHINE
René A. Baudry, Wilkinsburg, Pa., assignor to Westinghouse Electric Corporation, East Pittsburgh, Pa., a corporation of Pennsylvania
Filed Aug. 12, 1960, Ser. No. 49,270
15 Claims. (Cl. 310—55)

The present invention relates to the ventilation of dynamoelectric machines, and more particularly to an improved cooling system for turbine generators of large size.

Large turbine generators are usually of the inner cooled, or direct cooled, construction in which a coolant fluid is circulated through duct means in the stator and rotor slots in direct thermal relation with the current-carrying conductors inside the ground insulation. This type of construction provides a very effective cooling system and has made it possible to greatly increase the maximum ratings obtainable in large generators without exceeding the permissible limits of physical size.

These machines have usually been cooled by a suitable coolant gas, normally hydrogen, which fills the housing and is circulated by a blower on the rotor shaft through the ducts of the stator and rotor windings. As the length of machines of this type is increased, however, to obtain higher ratings, it becomes increasingly difficult to force a sufficient amount of gas through the ducts from end to end of the winding. This is because the mass of gas necessary to remove the heat from a coil increases proportionally to the length of the coil. At a given static gas pressure, therefore, the required velocity of the gas through the duct is directly proportional to the duct length, and the necessary blower pressure to maintain this velocity increases as the cube of the length. Such blower pressures rapidly become prohibitive as the length of the machine increases and the effectiveness of cooling decreases as the length increases.

It has been proposed to improve the cooling of the rotor by dividing the longitudinal ducts into a plurality of relatively short, longitudinally aligned flow paths with inlet and outlet passages to the air gap, so that the coolant gas flows from the air gap into these relatively short passages in parallel and is discharged back into the air gap. In this arrangement, the necessary pumping pressure to force the gas through the ducts is derived from the rotation of the rotor, and is obtained by suitably shaping the inlet and outlet openings in the rotor surface. The pressure of the blower cannot readily be used in this arrangement, because of the large air gap which is used in these machines, and the pressure available for forcing the gas through the ducts is relatively low so that only a small improvement in cooling is obtainable in this way.

The principal object of the present invention is to provide an improved cooling system for large dynamoelectric machines of the inner cooled type in which the rotor is very effectively cooled regardless of its length.

Another object of the invention is to provide a cooling system for large inner cooled dynamoelectric machines in which the rotor is cooled by circulation of gas from the air gap of the machine through a plurality of relatively short axial paths in the rotor, and in which the pressure developed by a blower on the rotor shaft is utilized to force the gas through the rotor ducts.

A further object of the invention is to provide a dynamoelectric machine of the inner cooled type in which the rotor is cooled by circulation of gas from the air gap through short axial paths in the rotor between alternating high pressure and low pressure zones in the air gap, so that the blower pressure can be utilized to force adequate gas flow through the rotor ducts, and in which the stator winding is cooled by circulation of a coolant fluid through the ducts associated with the stator conductors in a closed system separate from the cooling system for the rotor.

More specifically, a cooling system is provided for large generators in which the air gap is divided transversely by baffle members into a plurality of annular zones. Alternate zones are connected to the high pressure or discharge side of a blower mounted on the rotor shaft and the remaining zones are connected with the low pressure or entrance side of the blower. Radial ducts or passages in the rotor in each zone permit the gas to flow from the high pressure zones to the adjacent low pressure zones through the longitudinal rotor ducts, and thus the blower pressure is used to force the gas through the rotor ducts in a plurality of short axial paths so that adequate gas flow is obtained and very effective cooling results. When a separate closed system is used for circulating a coolant fluid through the stator winding, the cooling of the stator is also greatly improved and a machine is obtained in which greatly increased electrical rating is possible without increasing the physical size, because of the very effective removal of heat.

The invention will be more fully understood from the following detailed description, taken in connection with the accompanying drawing, in which.

Figure 1:
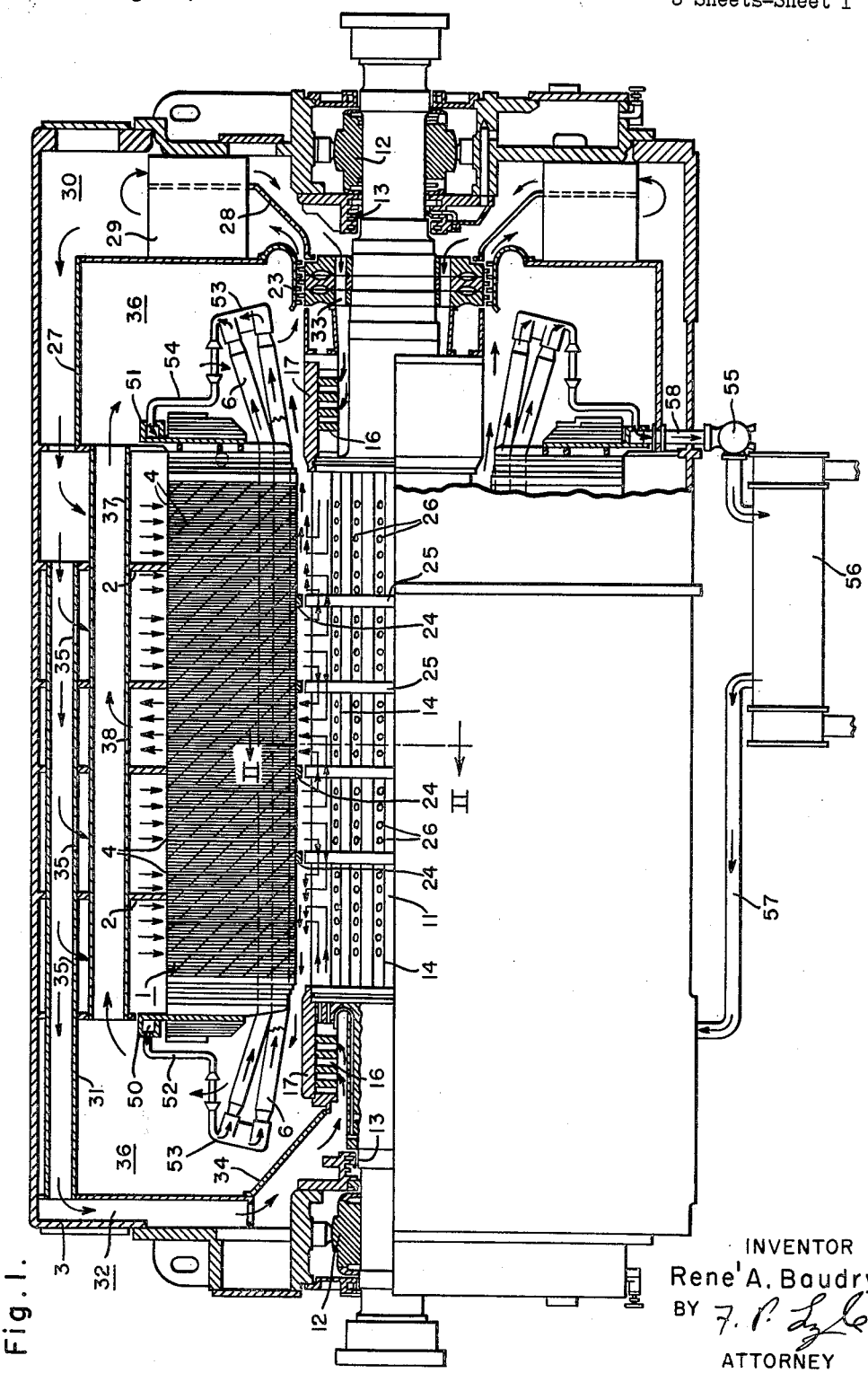
FIGURE 1 is a longitudinal sectional view of a large generator, partly in elevation, showing an illustrative embodiment of the invention.

The invention is shown in the drawing embodied in a large turbine generator. The generator is shown as having a stator member which includes a stator core 1 supported by frame rings 2 in a substantially gas-tight outer housing 3. The stator member may be of any usual or suitable type of construction, and the stator core 1 is a laminated annular core of the usual type having a cylindrical bore. The core 1 is built up of laminations arranged in spaced stacks to provide radial vent ducts 4 between them, and the laminations of the core are clamped between suitable end plates in the usual manner.

Figure 2:
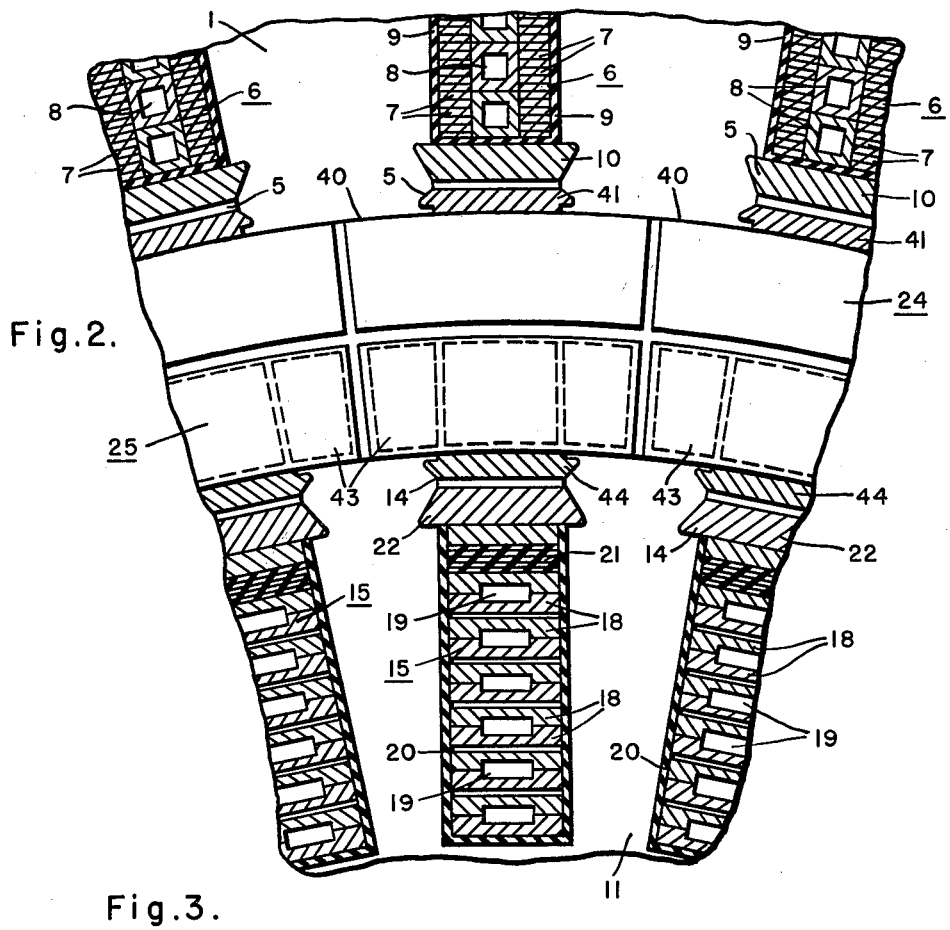
FIG. 2 is an enlarged fragmentary tranverse sectional view of a portion of the stator and rotor, substantially on the line II—II of FIG. 1.

The stator core 1 is provided with longitudinal slots 5 in its inner periphery for the reception of a stator winding which may be of any suitable type and may consist of a plurality of half coils 6 connected at their ends to form the winding. The stator winding is of the inner cooled construction and, as shown in FIG. 2, each half coil 6 consists of two stacks of conductor strands 7 which are lightly insulated and transposed in the usual manner, and which are separated by a stack of ducts 8 of high resistance metal which are lightly insulated from each other and from the conductor strands 7. The ducts 8 extend longitudinally from one end to the other of the half coil 6 for circulation of a coolant fluid in close thermal relation to the conductor strands 7. The half coil is enclosed in a heavy sheath of insulation 9 to provide the necessary high voltage insulation to ground. Two half coils are placed in each slot 5 of the stator core 1 and the slots are closed by suitable wedges 10.

The rotor 11 is disposed in the bore of the stator core 1 and separated from the stator by an annular air gap. The rotor 11 is supported in bearings 12 of any suitable type mounted in the ends of the housing 3, and gland seals 13 are provided to prevent leakage of gas from the housing along the shaft. The rotor 11 is provided with longitudinal slots 14 in its periphery for the reception of a field winding 15. The conductors of the winding 15 extend longitudinally of the rotor and have circumferentially extending end turn portions 16 which are supported against centrifugal forces by retaining rings 17 of usual construction. As shown in FIGURE 2, the rotor winding 15 consists of a plurality of insulated turns each of which consists of two generally channel shaped conductors 18 which are placed in face-to-face relation to form a longitudinal duct 19 extending from end to end of the rotor through the center of each turn of the winding. The winding 15 is insulated from the rotor core by insulating slot liners 20. A suitable insulating member 21 may be placed at the top of the winding in each slot 14 and the slot is closed by a wedge 22. The ducts 19 thus extend from end to end of the rotor and provide for the circulation of coolant gas in direct thermal relation to the conductors 18.

As previously indicated, the housing 3 of the machine is made as nearly gas-tight as possible, and is sealed at the points where the rotor shaft passes through it by the gland seals 13. The housing is filled with a suitable coolant gas, which is preferably hydrogen, and which is used in the illustrated embodiment for cooling the rotor and the stator core. A blower 23 is mounted on the rotor shaft adjacent one end of the machine for circulating the gas therethrough. Any suitable type of blower may be utilized and a multistage blower of the axial flow type is shown in the drawing for the purpose of illustration. The gas in the machine is maintained at a suitable static pressure, which may for example be from 30 to 75 pounds per square inch above atmospheric pressure, although lower or higher gas pressures might be utilized, depending on the desired rating of the machine. The blower 23 develops a sufficient differential pressure to maintain the desired circulation of gas within the housing and through the various ducts in the manner described hereinafter.

As previously mentioned, it becomes increasingly difficult, as the length of a machine of this type is increased, to circulate adequate quantities of gas through the long rotor ducts 19 from one end of the rotor to the other or to the center, because of the necessarily small cross-sectional area of the ducts. In accordance with the present invention, therefore, the path of the gas through the rotor ducts is divided into a plurality of relatively short longitudinal paths, and the pressure of the blower 23 is utilized to cause the gas to flow through these short paths so that an adequate flow of gas is readily obtained. For this purpose, the air gap is divided transversely into a plurality of annular zones. This is done by means of annular baffle members placed in the air gap and extending around the bore of the stator to form the annular zones.

Adjacent zones are maintained at different gas pressures to cause the gas to flow from one zone to the next through the rotor ducts. In the preferred embodiment shown in the drawing, a plurality of annular baffle members 24 are mounted on the stator core and corresponding annular baffles 25 are mounted on the periphery of the rotor. The baffles 24 and 25 may be of any suitable construction, certain specific constructions being more fully described below, and they are radially aligned with each other, as shown in FIG. 1, with a small running clearance between them. The baffles thus divide the air gap transversely into a plurality of annular zones, five such zones being shown in the illustrated embodiment of the invention.

Figure 4:
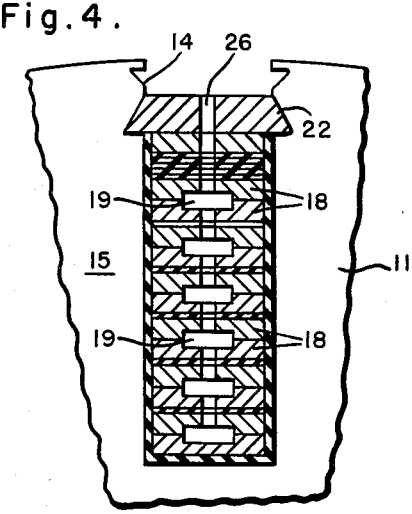
FIG. 4 is a fragmentary transverse sectional view of a portion of the rotor on a different plane from the view of FIG. 2.

The rotor 11 is provided with radial gas passages in each of the zones of the air gap. Thus, as shown in FIGURE 4, radial holes 26 may be drilled through the wedge 22 and through the conductors 18 in each slot of the rotor to provide axial passages from the air gap communicating with the longitudinal gas ducts 19 of the rotor winding. Several of these gas passages 26 may be provided in each slot of the rotor in each of the zones of the air gap, as indicated in FIGURE 1, so that gas may flow from one zone of the air gap to an adjoining zone through the radial passages and longitudinal ducts of the rotor conductors. This flow of gas is effected by connecting alternate zones of the air gap to the high pressure side of the blower 23 and connecting the remaining zones to the low pressure side of the blower, so that a pressure difference exists between adjacent zones of the air gap to cause the desired gas flow through the rotor ducts.

The necessary gas flow in the housing 3 may be effected by suitable baffling in any desired manner. In the illustrated embodiment of the invention, a generally cylindrical baffle member 27 is provided adjacent the blower 23 to separate the entrance side of the blower from the discharge side. The high pressure gas discharged from the blower is directed by a conical baffle 28 to flow through coolers 29 of any suitable type into a high pressure zone 30 into the end of the housing, and gas from the high pressure zone 30 flows through ducts 31 to another high pressure zone 32 at the opposite end of the housing. Gas from the high pressure zone 30 is also directed by the baffle 28 to flow through passages 33 under the blower 23 to the end turns 16 of the rotor winding and thus into the ends of the gas ducts 19 at that end of the rotor. Gas from the high pressure zone 32 at the opposite end of the machine is similarly directed by a conical baffle 34 to flow over the end turns 16 of the rotor winding at that end of the machine and into the ducts 19 at that end of the rotor.

High pressure gas is also supplied through openings 35 in the ducts 31 to certain of the annular spaces formed on the outside of the stator core 1 by the frame rings 2. In the illustrated embodiment, high pressure gas is thus supplied to the two end annular spaces at both ends of the core but is prevented from flowing to the central annular space. The high pressure gas in these annular spaces flows through the radial vent ducts 4 of the core 1 to the air gap, cooling the core and flowing into the air gap. It will be noted that the number of annular spaces on the outside of the core corresponds to the number of annular zones of the air gap. The end zones of the air gap are of course open at the ends of the core and communicate with low pressure zones 36 at each end of the machine. The low pressure zones 36 are connected by ducts 37 and communicate directly with the entrance or low pressure side of the blower 23. Thus, the two end zones of the air gap are connected to the entrance side of the blower 23. The center zone of the air gap is connected through the radial vent ducts 4 of the stator core to the central annular space around the outside of the core which, in turn, is connected to the low pressure side of the blower by openings 38 in the ducts 37.

It will be seen that in the illustrated embodiment, with the air gap divided into five zones, the center and end zones of the air gap are connected to the low pressure side of the blower while the remaining two zones are connected to the high pressure side of the blower. Thus, alternate zones of the air gap are connected to a high pressure source of coolant gas while the remaining zones are connected to a region of lower pressure. It will be understood that any suitable number of zones may be provided. Thus, in a longer machine more than five zones may be provided and connected alternately to the high pressure and low pressure sides of the blower by suitable baffling and ducts, while in a shorter machine, three zones might be sufficient.

The circulation of gas in the machine is indicated by the arrows in FIGURE 1. High pressure gas leaving the blower 23 flows through the coolers 29 and a portion of it flows through the passages 33 and into the rotor ducts 19 at that end of the rotor. High pressure gas also flows through the ducts 31 to the opposite end of the machine and into the rotor ducts at that end in the manner previously described. An additional part of the high pressure gas escapes from the ducts 31 through the openings 35 and flows through the radial ducts 4 of the stator core 1 to the air gap. The end zones of the air gap are connected to the entrance of the blower 23, so that they are low pressure zones, and the gas discharging into these zones of the air gap returns to the blower 23 through the low pressure zones 36 and ducts 37. The high pressure gas entering the two intermediate zones of the air gap flows through the radial passages 26 of the rotor into the rotor ducts 19 and longitudinally to the adjacent zones as shown by the arrows. The gas is discharged from the rotor into these zones and passes directly to the blower 23 from the end zones, and through the core ducts 4 and the ducts 37 to the blower from the center zone. Thus, the coolant gas flows longitudinally through the rotor in a plurality of relatively short paths and adequate gas flow is obtained by making use of the blower pressure to force the gas to flow through the rotor from the high pressure zones of the air gap to the adjacent low pressure zones. In this way, very effective cooling of the rotor is obtained regardless of its length.

As previously described, the air gap is divided transversely into annular zones by baffle members mounted on the rotor and stator. Any suitable construction may be used for these baffles. Thus, for example, the rotor baffles may be rings of non-magnetic material shrunk or otherwise secured on the rotor surface at the appropriate places, the diameter of the rotor baffles being not less than the outer diameter of the retaining rings 17, so as to make removal of the rotor possible.

The stator baffles might also be continuous rings attached in any desired manner to the stator core. A preferred type of construction for these baffles is shown, however, in FIGURES 2 and 3. As there shown, each of the baffles 24 consists of a plurality of segmental members 40 which abut each other to form a continuous annular baffle member. Each of the segmental members 40 has a dovetail block or retaining member 41 attached to it which fits in the corresponding slot 5 of the stator core 1. The blocks 41 may be wedged in the grooves 5 or held in place by lock plates 42, or they may be attached in any other desired manner to mount them securely on the core. If desired the segments 40 may be made removable by sliding them longitudinally out of the slots 5, and at least some of the segments at the bottom of the core should be removable in this way to permit a skid to be inserted for removal of the rotor when necessary.

Figure 3:
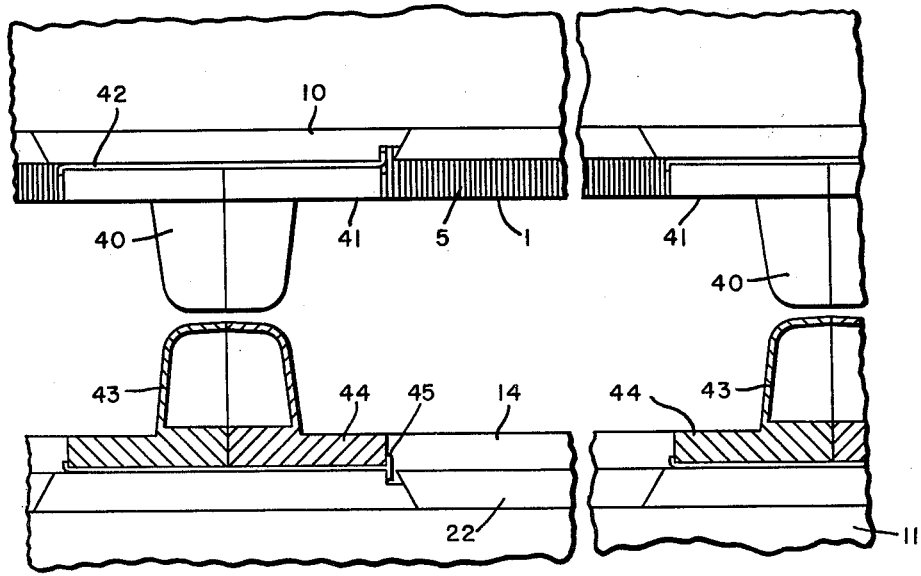
FIG. 3 is an enlarged fragmentary longitudinal sectional view through a portion of the stator and rotor.

The rotor baffles 25 may be of similar construction, as shown in FIGURES 2 and 3, and may consist of a plurality of segments 43 provided with dovetail blocks 44 which fit in the slots 14 of the rotor and which may be wedged in place, or otherwise secured in any desired manner, as by lock plates 45. The outer diameter of the rotor baffles must, of course, be at least as great as the diameter of the retaining rings 17 to permit the rotor to be inserted into the bore of the stator and removed therefrom.

Figure 5:
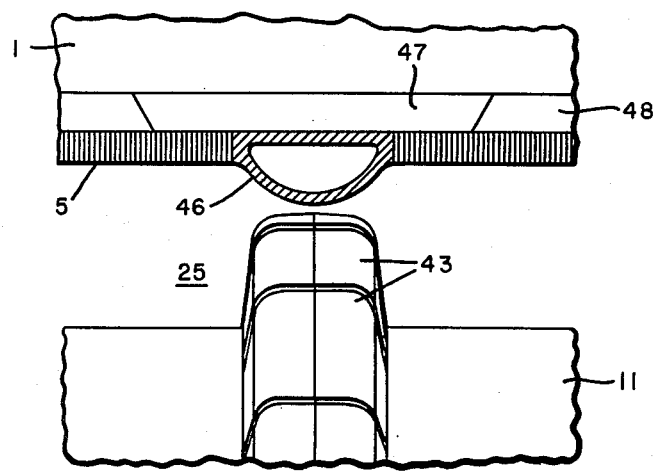
FIG. 5 is a view similar to FIG. 3, illustrating a modified embodiment of the invention.

It will be obvious that various other constructions may be utilized for the rotor and stator baffles and any suitable construction is within the scope of the invention. For example, as shown in FIGURE 5, the stator baffles might consist of annular hollow members 46 extending around the interior of the stator core and made of rubber or other elastomeric material. These baffle members 46 may be attached to dovetail blocks 47 secured in the stator slots 5 by wedges 48. The baffle members 46 would normally be inflated as shown in the drawing, by air pressure or by a suitable liquid or plastic filling. The annular baffle members 46 can readily be collapsed by evacuating them, or otherwise removing the filling, to facilitate removal of the rotor. The rotor baffles 25 may be of the construction shown in FIGS. 2 and 3. Obviously, other suitable constructions may be utilized for either the stator or rotor baffles.

With this pressurized air gap construction, very effective cooling of the rotor is obtained, and it is desirable to provide a correspondingly effective cooling means for the stator. In the usual construction of inner cooled generators, the stator winding is cooled by circulation of the gas in the housing through the stator winding ducts 8 from one end to the other of each half coil 6. This arrangement will be satisfactory in many cases, but for more effective cooling a separate closed system for cooling the stator winding is preferably used in connection with the type of rotor cooling disclosed above.

As shown in FIGURE 1, such a stator cooling system may include an intake manifold 50 at one end of the stator core 1 and a discharge manifold 51 at the opposite end. These manifolds may be annular passages extending circumferentially around the core and mounted at the ends of the core in any suitable manner. The intake manifold 50 is connected by a plurality of insulating pipes or tubes 52 to the end of each half coil 6 of the winding, the tubes 52 being connected by suitable fittings 53 to the ducts 8 of the coils. At the opposite end, similar fittings 53 connect the ducts 8 of the coils 6 to insulating pipes 54 which are connected to the discharge manifold 51.

The coolant for the stator winding is circulated by means of an external pump 55 which pumps the coolant discharged from the machine through a cooler 56, of any suitable type, and through an entrance pipe 57 which passes through the housing 3 and is connected to the intake manifold 50. The coolant discharged at the opposite end of the machine flows from the discharge manifold 51 to a discharge pipe 58 which passes through the housing 3 to the pump 55. In this way a closed recirculating system is provided which is entirely separate from the cooling system for the rotor and the stator core, so that more effective cooling of the stator winding can be obtained. The coolant for the stator winding may be a suitable liquid such as water, in the system shown in the drawing, or other suitable coolant fluids might be utilized. Thus, hydrogen at a high pressure of the order of several hundred pounds per square inch might be circulated through the stator winding in an essentially similar system to that shown, or in the manner shown in Baudry Patent No. 2,873,393. In this way, very effective cooling of the stator is obtained and with the effective rotor cooling obtainable by the means disclosed above, a substantial increase in rating of the machine is obtainable, as compared to conventional constructions, without any substantial change in physical size.

It should now be apparent that a cooling system has been provided for large dynamoelectric machines such as turbine generators which makes possible a very significant improvement in cooling and a corresponding increase in the rating obtainable from a given size machine. This result is obtained by dividing the longitudinal path of the gas in the rotor conductor ducts into a plurality of short paths and by dividing the air gap into corresponding zones of alternating high and low gas pressure, so that the gas flows from the high pressure zones to the adjacent low pressure zones through the rotor ducts. This arrangement makes use of the blower pressure to force the gas to flow through the rotor ducts and thus makes possible an adequate flow of gas for very effective cooling. Obviously, any desired or necessary number of zones could be provided in the air gap, and the length of the machine is no longer a limitation on the cooling since the length of the individual flow paths through the rotor can be made the same regardless of the total length of the rotor. The ventilation of large turbine generators is thus significantly improved and when this new ventilation system is used in combination with a separate coolant circulating system for the stator winding as described above, a very substantial increase in the rating of these machines is made possible.

A preferred embodiment of the invention has been shown and described for the purpose of illustration, but it will be apparent that various modifications and other embodiments are possible. Thus, for example, any suitable coolant fluid might be used in either the stator or the rotor, and any suitable type of construction might be utilized for the air gap baffles. It is to be understood therefore, that the invention is not limited to the specific arrangement and details of construction shown and described, but in its broadest aspects is includes all equivalent modifications and embodiments.

I claim as my invention:

1. A dynamoelectric machine having a stator member and a rotor member with an annular air gap therebetween, a substantially gas-tight housing enclosing the stator and rotor members and containing a coolant gas, the rotor member having conductors extending longitudinally thereof and having longitudinal duct means for circulation of gas in good thermal relation to the conductors, means for dividing said air gap transversely into a plurality of annular zones, means for maintaining a higher pressure of coolant gas in alternate ones of said zones than in the remaining zones, and generally radial gas passages in the rotor member disposed within each zone of the air gap and communicating with said longitudinal duct means.

2. A dynamoelectric machine having a stator member and a rotor member with an annular air gap therebetween, a substantially gas-tight housing enclosing the stator and rotor members and containing a coolant gas, the rotor member having conductors extending longitudinally thereof and having longitudinal duct means for circulation of gas in good thermal relation to the conductors, means for dividing said air gap transversely into a plurality of annular zones, means for circulating said coolant gas within the housing, said circulating means maintaining the gas at a relatively high pressure in alternate zones of the air gap and at a lower pressure in the remaining zones, and generally radial passages in the rotor member disposed within each zone of the air gap and communicating with said longitudinal duct means.

3. A dynamoelectric machine having a stator member and a rotor member with an annular air gap therebetween, a substantially gas-tight housing enclosing the stator and rotor members and containing a coolant gas, the rotor member having conductors extending longitudinally thereof in peripheral slots and including longitudinal duct means within the slots for circulation of gas in direct thermal relation to the conductors, means for dividing the air gap transversely into a plurality of annular zones, means for maintaining a higher pressure of coolant gas in alternate ones of said zones than in the remaining zones, and generally radial gas passages in the rotor member disposed within each zone of the air gap and communicating with said longitudinal duct means.

4. A dynamoelectric machine having a stator member and a rotor member with an annular air gap therebetween, a substantially gas-tight housing enclosing the stator and rotor members and containing a coolant gas, the rotor member having conductors extending longitudinally thereof in peripheral slots and including longitudinal duct means within the slots for circulation of gas in direct thermal relation to the conductors, means for dividing the air gap transversely into a plurality of annular zones, means for circulating said coolant gas within the housing, said circulating means maintaining the gas at a relatively high pressure in alternate zones of the air gap and at a lower pressure in the remaining zones, and generally radial passages in the rotor member disposed within each zone of the air gap and communicating with said longitudinal duct means.

5. A dynamoelectric machine having a stator member and a rotor member with an annular air gap therebetween, a substantially gas-tight housing enclosing the stator and rotor members and containing a coolant gas, the rotor member having conductors extending longitudinally thereof and having longitudinal duct means for circulation of gas in good thermal relation to the conductors, means for dividing said air gap transversely into a plurality of annular zones, blower means for circulating said coolant gas within the housing, means for connecting alternate zones of the air gap to the discharge side of said blower means, the remaining zones of the air gap communicating with the entrance side of the blower means, and the rotor member having generally radial passages therein disposed within each zone of the air gap and communicating with said longitudinal duct means.

6. A dynamoelectric machine having a stator member and a rotor member with an annular air gap therebetween, a substantially gas-tight housing enclosing the stator and rotor members and containing a coolant gas, the rotor member having conductors extending longitudinally thereof in peripheral slots and including longitudinal duct means within the slots for circulation of gas in direct thermal relation to the conductors, means for dividing the air gap transversely into a plurality of annular zones, blower means for circulating said coolant gas within the housing, means for connecting alternate zones of the air gap to the discharge side of said blower means, means for connecting the remaining zones of the air gap to the entrance side of the blower means, and the rotor member having generally radial passages therein disposed within each zone of the air gap and communicating with said longitudinal duct means in each of said slots.

7. A dynamoelectric machine having a stator member including a stator core having a cylindrical bore, a rotor member disposed in said bore and separated from the stator core by an annular air gap, a substantially gas-tight housing enclosing the stator and rotor members and containing a coolant gas, the rotor member having conductors extending longitudinally thereof in peripheral slots and including longitudinal duct means within the slots for circulation of gas in direct thermal relation to the conductors, baffle members disposed in said air gap and spaced apart longitudinally of the machine to divide the air gap transversely into a plurality of zones, means for circulating said coolant gas within the housing, said circulating means maintaining the gas at a relatively high pressure in alternate zones of the air gap and at a lower pressure in the remaining zones, and the rotor member having generally radial gas passages disposed within each zone of the air gap and communicating with said longitudinal ducts means.

8. A dynamoelectric machine having a stator member including a stator core having a cylindrical bore, a rotor member disposed in said bore and separated from the stator core by an annular air gap, a substantially gas-tight housing enclosing the stator and rotor members and containing a coolant gas, the rotor member having conductors extending longtudinally thereof in peripheral slots and including longitudinal duct means within the slots for circulation of gas in direct thermal relation to the conductors, a plurality of circular baffle members disposed in said air gap and spaced apart longitudinally of the machine to divide the air gap transversely into a plurality of zones, blower means for circulating said coolant gas within the housing, means for connecting alternate zones of the air gap to the discharge side of said blower means, the remaining zones of the air gap communicating with the entrance side of the blower means, and the rotor member having generally radial passages therein disposed within each zone of the air gap and communicating with said longitudinal duct means.

9. A dynamoelectric machine having a stator member including a stator core having a cylindrical bore, a rotor member disposed in said bore and separated from the stator core by an annular air gap, a substantially gas-tight housing enclosing the stator and rotor members and containing a coolant gas, the rotor member having conductors extending longitudinally thereof in peripheral slots and including longitudinal duct means within the slots for circulation of gas in direct thermal relation to the conductors, a plurality of stationary baffle members mounted on the stator member within said air gap and spaced apart longitudinally of the machine, a plurality of rotating baffle members mounted on the rotor member within the air gap, said rotating baffle members being aligned with the stationary baffle members and the stationary and rotating baffle members cooperating to divide the air gap transversely into a plurality of annular zones, means for circulating said coolant gas within the housing, said circulating means maintaining the gas at a relatively high pressure in alternate zones of the air gap and at a lower pressure in the remaining zones, and the rotor member having generally radial gas passages disposed within each zone of the air gap and communicating with said longitudinal duct means.

10. A dynamoelectric machine having a stator member including a stator core having a cylindrical bore, a rotor member disposed in said bore and separated from the stator core by an annular air gap, a substantially gas-tight housing enclosing the stator and rotor members and containing a coolant gas, the rotor member having conductors extending longitudinally thereof in peripheral slots and including longitudinal duct means within the slots for circulation of gas in direct thermal relation to the conductors, a plurality of stationary baffle members mounted on the stator member within said air gap and spaced apart longitudinally of the machine, a plurality of rotating baffle members mounted on the rotor member within the air gap, said rotating baffle members being aligned with the stationary baffle members and the stationary and rotating baffle members cooperating to divide the air gap transversely into a plurality of annular zones, blower means for circulating said coolant gas within the housing, means for connecting alternate zones of the air gap to the discharge side of said blower means, means for connecting the remaining zones of the air gap to the entrance side of the blower means, and the rotor member having generally radial passages therein disposed within each zone of the air gap and communicating with said longitudinal duct means in each of said slots.

11. A dynamoelectric machine having a stator member including a stator core having a cylindrical bore, a rotor member disposed in said bore and separated from the stator core by an annular air gap, a substantially gas-tight housing enclosing the stator and rotor members and containing a coolant gas, the rotor member having conductors extending longitudinally thereof in peripheral slots and including longitudinal duct means within the slots for circulation of gas in direct thermal relation to the conductors, a plurality of stationary baffle members mounted on the stator member within said air gap and spaced apart longitudinally of the machine, each of said stationary baffle members comprising a plurality of segmental members mounted on the stator core, at least some of said segmental members of each baffle member being individually removable, a plurality of rotating baffle members mounted on the rotor member within the air gap, said rotating baffle members being aligned with the stationary baffle members and the stationary and rotating baffle members cooperating to divide the air gap transversely into a plurality of annular zones, blower means for circulating said coolant gas within the housing, means for connecting alternate zones of the air gap to the discharge side of said blower means, means for connecting the remaining zones of the air gap to the entrance side of the blower means, and the rotor member having generally radial passages therein disposed within each zone of the air gap and communicating with said longitudinal duct means in each of said slots.

12. A dynamoelectric machine having a stator member and a rotor member, said stator member including a stator core having a cylindrical bore with longitudinal slots therein, a plurality of stator winding members disposed in said slots, said winding members including duct means extending longitudinally within the slots, means for circulating a coolant fluid through said duct means, said rotor member being disposed in the bore of the stator core and separated therefrom by an annular air gap, the rotor member having conductors extending longitudinally thereof in peripheral slots and including longitudinal duct means within the slots, a substantially gas-tight housing enclosing the stator and rotor members and containing a coolant gas, baffle members disposed in said air gap and spaced apart longitudinally of the machine to divide the air gap transversely into a plurality of zones, means for circulating said coolant gas within the housing, said circulating means maintaining the gas at a relatively high pressure in alternate zones of the air gap and at a lower pressure in the remaining zones, and the rotor member having generally radial gas passages disposed within each zone of the air gap and communicating with said longitudinal duct means.

13. A dynamoelectric machine having a stator member and a rotor member, said stator member including a stator core having a cylindrical bore with longitudinal slots therein, a plurality of stator winding members disposed in said slots, said winding members including duct means extending longitudinally within the slots, means for circulating a coolant fluid through said duct means, said rotor member being disposed in the bore of the stator core and separated therefrom by an annular air gap, the rotor member having conductors extending longitudinally thereof in peripheral slots and including longitudinal duct means within the slots, a substantially gas-tight housing enclosing the stator and rotor members and containing a coolant gas, baffle members disposed in said air gap and spaced apart longitudinally of the machine to divide the air gap transversely into a plurality of zones, blower means for circulating said coolant gas within the housing, means for connecting alternate zones of the air gap to the discharge side of said blower means, means for connecting the remaining zones of the air gap to the entrance side of the blower means, and the rotor member having generally radial passages therein disposed within each zone of the air gap and communicating with said longitudinal duct means in each of said slots.

14. A dynamoelectric machine having a stator member and a rotor member, said stator member including a stator core having a cylindrical bore with longitudinal slots therein, a plurality of stator winding members disposed in said slots, said winding members including duct means extending longitudinally within the slots, means for circulating a coolant fluid through said duct means, said rotor member being disposed in the bore of the stator core and separated therefrom by an annular air gap, the rotor member having conductors extending longitudinally thereof in peripheral slots and including longitudinal duct means within the slots, a substantially gas-tight housing enclosing the stator and rotor members and containing a coolant gas, a plurality of annular baffle members mounted in the slots of the stator core and spaced apart longitudinally of the machine, a plurality of annular baffle members mounted on the rotor member within the air gap, said last-mentioned baffle members being aligned with the first-mentioned baffle members and cooperating therewith to divide the air gap transversely into a plurality of zones, blower means for circulating said coolant gas within the housing, means for connecting alternate zones of the air gap to the discharge side of said blower means, means for connecting the remaining zones of the air gap to the entrance side of the blower means, and the rotor member having generally radial passages therein disposed within each zone of the air gap and communicating with said longitudinal duct means in each of said slots.

15. A dynamoelectric machine having a stator member and a rotor member, said stator member including a stator core having a cylindrical bore with longitudinal slots therein, a plurality of stator winding members disposed in said slots, said winding members including duct means extending longitudinally within the slots, means for circulating a coolant fluid through said duct means, said rotor member being disposed in the bore of the stator core and separated therefrom by an annular air gap, the rotor member having conductors extending longitudinally thereof in peripheral slots and including longitudinal duct means within the slots, a substantially gas-tight housing enclosing the stator and rotor members and containing a coolant gas, a plurality of annular baffle members mounted on the stator core within the air gap and spaced apart longitudinally of the machine, each of said baffle members comprising a plurality of segmental members mounted in the slots of the stator core, at least some of said segmental members of each baffle member being individually removable, a plurality of annular baffle members mounted on the rotor member within the air gap, said last-mentioned baffle members being aligned with the first-mentioned baffle members and cooperating therewith to divide the air gap transversely into a plurality of zones, blower means for circulating said coolant gas within the housing, means for connecting alternate zones of the air gap to the discharge of said blower means, means for connecting the remaining zones of the air gap to the entrance side of the blower means, and the rotor member having generally radial passages therein disposed within each zone of the air gap and communicating with said longitudinal duct means in each of said slots.

References Cited in the file of this patent

UNITED STATES PATENTS 2,695,368     Kilbourne    ------------ Nov. 23, 1954

FOREIGN PATENTS 612,236     Germany    -------------- Apr. 16, 1935